UNITED STATES PATENT OFFICE.

BRUNO RICHARD SEIFERT, OF RADEBEUL, NEAR DRESDEN, GERMANY, ASSIGNOR TO DR. F. VON HEYDEN NACHFOLGER, OF SAME PLACE.

DYE FROM ALPHA OXYUVITIC ACID.

SPECIFICATION forming part of Letters Patent No. 493,413, dated March 14, 1893.

Application filed May 13, 1892. Serial No. 432,870. (Specimens.)

*To all whom it may concern:*

Be it known that I, BRUNO RICHARD SEIFERT, of Radebeul, near Dresden, in the Kingdom of Saxony, German Empire, have invented certain new and useful Improvements in the Manufacture of Coloring-Matter from Alpha Oxyuvitic Acid, of which the following is a specification.

Chemists have heretofore generally assumed that in the action of diazo compounds upon phenols no combination takes place when the para and both the ortho positions are occupied in the phenol (see Noelting and Kohn, *Berichte* 17–358, and Schultz, *Chemistry of Coal Tar*, 2d ed., Vol. II, p. 139). I have now discovered on the contrary that alpha oxyuvitic acid

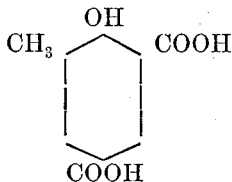

reacts with diazo compounds with the same facility as phenol, salicylic acid and other phenols in which at least one ortho- or para-position is free.

The azo compounds hereinafter described are the first representatives of the new class of the meta oxy azo compounds

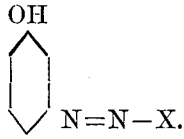

The manufacture of these new meta azo coloring matters is performed by means of the same manipulations which are used in the manufacture of the ortho and para azo coloring matters.

*Example.*—A solution of 14.1 parts by weight of benzidine sulphate diazotized in the ordinary way is mixed with a cold solution of 19.6 parts of alpha oxyuvitic acid in water and twenty parts of caustic soda. The coloring matter immediately appears and may be heated to 60° centigrade and salted out. It dyes unmordanted cotton yellow.

I have succeeded in combining the oxyuvitic acid in one molecular proportion with the following substances, viz:

Mordant dyeing wool dyes: 1, one molecular proportion of ortho diazo nitrobenzine; 2, one molecular proportion of meta diazo nitrobenzine; 3, one molecular proportion of para diazo nitrobenzine; 4, one molecular proportion of ortho diazo nitrotoluene; 5, one molecular proportion of para diazo nitrotoluene; 6, one molecular proportion of diazo benzine sulpho acid; 7, one molecular proportion of ortho diazo nitro benzine-sulpho acid; 8, one molecular proportion of diazotized alpha naphthylamine; 9, one molecular proportion of diazotized beta naphthylamine; 10, one molecular proportion of alpha naphthionic acid; 11, one molecular proportion of beta naphthionic acid. Substantive cotton dyes: 12, one-half molecular proportion of tetrazo diphenyl; 13, one-half molecular proportion of tetrazo ditolyl; 14, one-half molecular proportion of tetrazo stilbene disulpho acid; 15, one molecular proportion of tetrazo diphenyl; 16, one molecular proportion of tetrazo ditolyl; 17, one molecular proportion of tetrazo stilbene disulpho acid. The dyes numbered 15, 16 and 17 in this list contain another free diazo group and possess the following properties: (*a*) On being heated with water or diluted acids they generate nitrogen according to the known common reaction, the diazo group present being replaced by hydroxyl. The resulting products likewise form dyes or coloring matter. (*b*) They combine with another or additional molecule of a phenol and amine to form the coloring matters hereinafter specified. One molecular proportion of tetrazo diphenyl or tetrazoditolyl or tetrazostilbene disulpho acid with one molecule of oxyuvitic acid and 18, one molecular proportion of phenol; 19, one molecular proportion of ortho cresol; 20, one molecular proportion of meta cresol; 21, one molecular proportion of para cresol; 22, one molecular proportion of resorcin; 23, one molecular proportion of salicylic acid; 24, one molecular proportion of ortho cresotinic acid; 25, one molecular proportion of meta cresotinic acid; 26, one molecular proportion of para cresotinic acid; 27, one molecular proportion of alpha naphthol; 28, one molecular proportion of beta naphthol; 29, one molecular proportion of alpha naphthol sulpho acid; 30, one molecular proportion of alpha naphthol disulpho acid; 31, one molecular proportion of beta naphthol sulpho acid (Schäffer); 32, one molecular proportion of beta naphthol sulpho acid (Bayer); 33, one molecular proportion of beta naphthol disulpho acid G; 34, one molecular proportion of beta naphthol disulpho acid R; 35, one molecular proportion of beta naphthol trisulpho acid; 36, one molecular proportion of aniline; 37, one molecular proportion of dimethyl aniline; 38, one molecular proportion of cumidine; 39, one molecular proportion of sulphanilic acid; 40, one molecular proportion of ortho toluidin sulpho acid; 41, one molecular proportion of alpha naphthylamine; 42, one molecular proportion of beta naphthylamine; 43, one molecular proportion of alpha naphthionic acid; 44, one molecular proportion of beta naphthionic acid; 45, one molecular proportion of gamma naphthionic acid; 46, one molecular proportion of delta naphthionic acid; 47, one molecular proportion of beta naphthylamine disulpho acid G; 48, one molecular proportion of beta naphthylamine disulpho acid R; 49, one molecular proportion of dioxynaphthaline sulpho acid G; 50, one molecular proportion of phenylendiamine; 51, one molecular proportion of toluylendiamine; 52, one molecular proportion of Bismarck brown.

As equations for the formation of coloring matters from oxyuvitic acid the following may be named:

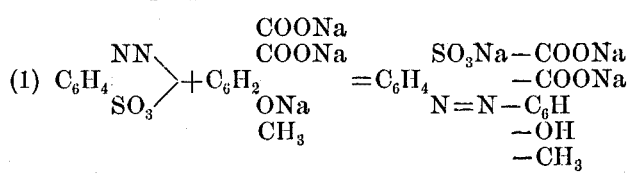

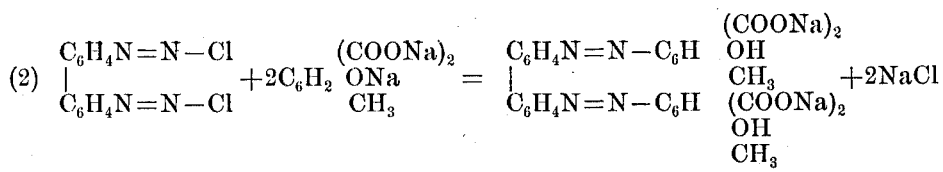

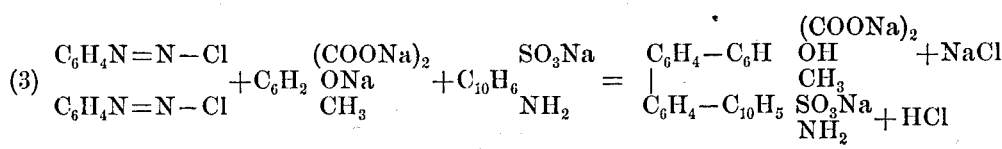

What I claim as my invention is—

The process herein described of manufacturing the new class of meta-azo-compounds herein described serving as coloring matters, said process consisting in combining alpha oxyuvitic acid with diazo-compounds such as herein specified.

In testimony that I claim the foregoing as my invention I have signed my name in presence of two subscribing witnesses.

BRUNO RICHARD SEIFERT.

Witnesses:
PAUL ARRAS,
WILHELM WIESENHÜTTER.